Dec. 14, 1965 M. WILLS 3,223,407
PRECISION VISE
Filed Feb. 3, 1964
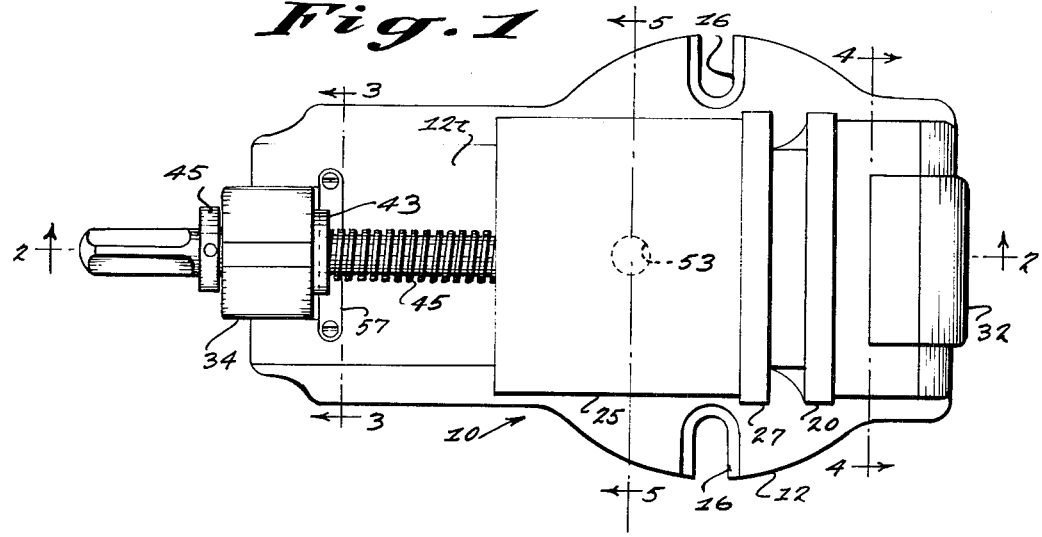
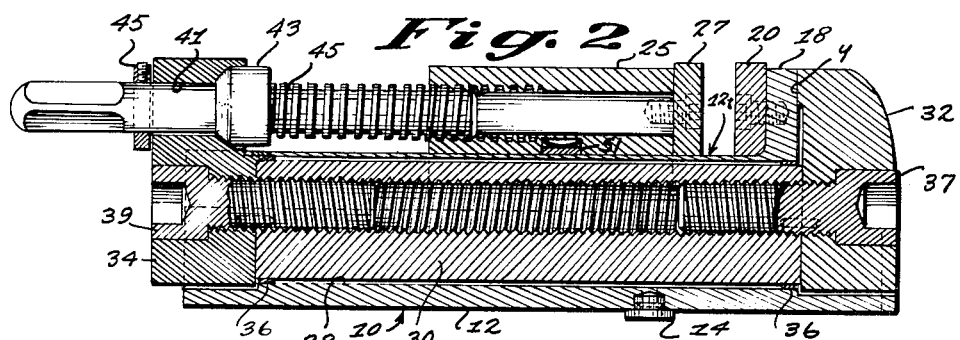
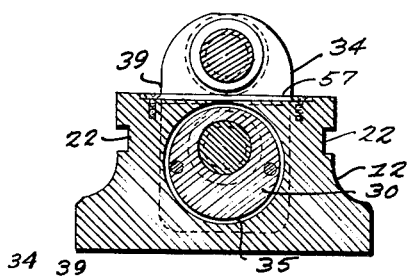
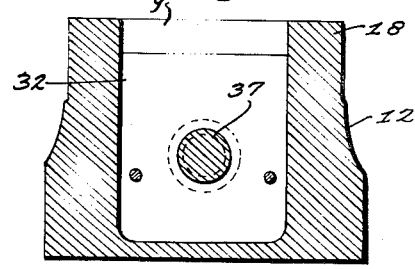
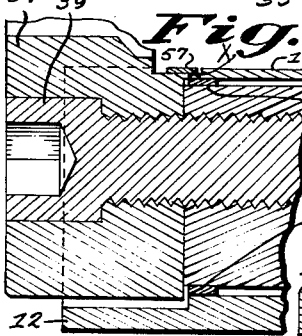
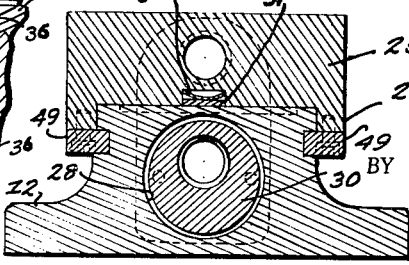
INVENTOR.
MARVIN WILLS
BY
Richard W. Hansz
ATTORNEY

United States Patent Office 3,223,407
Patented Dec. 14, 1965

3,223,407
PRECISION VISE
Marvin Wills, 2630 E. Willamette,
Colorado Springs, Colo.
Filed Feb. 3, 1964, Ser. No. 341,854
6 Claims. (Cl. 269—240)

The present invention relates to clamping and holding structures and more specifically to a vise especially suited for use with precision machine tools.

A double jawed vise is often used in connection with machine tools such as drill presses, grinders, milling machines and cutters as the means for holding the work piece in position while the machining operation is being performed. Once a set up has been made on a machine the accuracy of the machining operation depends on the ability of the device to hold the work pieces in a given position. Notwithstanding the heavy construction of prior art vises, the tightening of the vise jaws against the work piece establishes stresses in the vise body which result in strain and distortion of the vise and consequent movement of the work piece from its desired position. To illustrate this disadvantage further, it will be seen that as the movable jaw is tightened against the work piece forces are transmitted through the jaws and tightening means to the body or base of the vise which result in bending moments and extreme tension in the body of the vise. When such forces are present certain distortions appear which are felt by the jaws of the vise. In a high quality heavy duty machine tool vise normal tightening may result in tilting and vertical displacement of the work piece as much as .010 to .015 of an inch. Fine tools and techniques which seek closer tolerances than these figures are wasted when the holding device itself is not capable of maintaining the work piece absolutely stationary. Efforts to reduce this difficulty have been primarily directed to making the vise very large and heavy so as to reduce the strain, but even vises which are so heavy as to require lifting by mechanical hoists are susceptible to deformation sufficient to destroy precision tolerances.

It is therefore the primary object of the present invention to provide a vise which can be secured in place on the work supporting platform of a machine tool and which can be tightened without deformation of the vise body.

A second and related objective is to provide a machine tool vise capable of holding a work piece in a given position without movement of the piece during or after the securing of the piece in the jaws of the vise.

Another objective of the invention is to provide a means of stress isolation for a vise so that the jaw supporting body of the vise is subject to none of the tension or other stress associated with the clamping and holding action of the vise jaws.

A further object of the present invention is to provide a vise having the foregoing characteristics and yet being simple in construction and similar in operation to vises of the prior art.

Fundamentally the invention comprises a base or body member, including means for forming a fixed jaw thereon, which base member is disposed between the first and second jaws of a clamp. The first one of the clamping jaws is in partial contact with the fixed jaw means of the base member while the second of the clamping jaws serves to support and carry a mechanical means for moving a movable jaw which is also supported by the base member and which movable jaw cooperates with the fixed jaw forming means of the base member to hold objects therebetween. The clamp and its jaws is made to absorb all stress and strain developed by tightening the movable jaw against the work piece and the body or base of the vise is left free of stress and resultant strain.

The clamp of course may take many forms and may be related to the body of the vise in a variety of configurations, however, the preferred form is hereinafter explained in detail in connection with the accompanying drawings in which:

FIGURE 1 is a top plan view of the vise of the present invention.

FIGURE 2 is a cross-sectional view of the vise taken along lines 2—2 of FIGURE 1.

FIGURE 3 is a cross-sectional view taken along lines 3—3 of FIGURE 1.

FIGURE 4 is a cross-sectional view taken along lines 4—4 of FIGURE 1.

FIGURE 5 is a cross-sectional view taken along lines 5—5 of FIGURE 1.

FIGURE 6 is an enlarged fragmentary view of that portion of FIGURE 2 which illustrates the abuttment between the fixed bearing jaw and the base member of the vise.

Referring now to the drawings, a vise having the characteristics embodied in the present invention is seen in FIGURES 1 and 2 and is referred to generally by reference numeral 10. The vise is built around a base member 12 which is provided with a bottom guide 14 and bolt eyes 16 for mounting the vise in the channels of a work supporting table on a machine tool (not shown in the drawings). As part of the integral base member casting there is formed at one end of the base an upright fixed jaw 18 which has attached thereto a smooth surfaced hardened steel facing plate 20. A flattened and smoothed elongated portion of the top surface 12t of the base member together with a pair of opposing side opening base channels 22, define a way on which a movable jaw 25 is supported and is made to move lengthwise of the vise. The movable jaw 25 is supplied with a hardened steel facing place 27 whose outside vertical facing surface is parallel to the opposing face of the fixed jaw facing plate 20.

Lengthwise through the interior of the base member 12 there exists a relatively large cylindrical bore 28 for the purpose of housing a rigid cylindrical rod 30, which rod, acting with a pair of attached fixed jaw end pieces 32 and 34 comprise a clamp around the vise base member. The bore 28 is situated within the base member so that the axis of the rod 30 is parallel to the line of travel of the movable jaw 25. Since it is essential to the correct operation of the vise according to the objects of the invention, the diameter of the bore 28 in the base 12 is larger than the diameter of the rod 30 to the extent necessary to give freedom of strain and distortion to the rod member without the rod touching the base member, except at its very ends where the rod 30 is supported by a pair of annular bushings 36 and 35 press fitted into the two ends of the bore 28. The fixed jaw ends 32 and 34 are attached to the ends of the rod after the rod is in place within the base member by large threaded screws 37 and 39. By careful attention to FIGURES 2 and 6 of the drawings, it will be noted that the length of the clamp forming rod 30 is slightly greater than the length of the base member 12 along the center line thereof, leaving each end of the rod protruding past the end surfaces of the base member. Each of the opposed fixed jaws ends 32 and 34 are dimensioned and sized to provide a substantial clearance between the said jaw pieces and the adjacent portions of the base member 12 except for a small area of contact between a portion of the fixed base jaw 18 and a horizontal strip Y across the top of one fixed clamping jaw 32 and between the base member 12 and a horizontal strip X horizontally along the mid-portion of the other fixed jaw 34. The criteria for the large clearances between the base member 12 and rod 30 will be more fully explained as the specification continues.

Located above the level of the base top surface 12t and in a direction parallel to the clamping rod 30 is a transverse bore 41 in the fixed clamping jaw 34. The bore is enlarged on the inward facing side of the jaw 34 so as to accommodate the convex end portion of a collar 43 integrally formed on a threaded adjusting stem 45 journalled for rotation in the bore 41 of the fixed jaw 34. A retainer ring 47 surrounds the stem 45 on the outward facing side of the fixed jaw 34 to cooperate with the stem collar 43 to prevent axial movement of the stem 45 with respect to the fixed jaw 34. The threaded end of the adjusting stem 45 is engaged with an aligned threaded bore in the movable jaw 25 so that as the stem is rotated about its own axis the movable jaw will move axially along the threaded portion of the stem in a manner well known to the art.

Free and unrestricted sliding of the movable jaw 25 necessitates some clearance between the base member 12 and the downwardly extending side flanges 25f of the jaw 25 and also between the channel guide strips 49 of the jaw and the inside surfaces of the base member side channels 22. These clearances, however, prove to have adverse effects on precision movement of the jaw 25 as the stem is rotated to tighten the jaw against a work piece because the jaw tends to move upwardly to the extent permitted by the clearances when under stress. Such movement obviously tends to displace the work piece to the detriment of precision placement. To overcome the lifting effect associated with tightening the jaw, a biasing device is included in the construction of the movable jaw 25 to promote the objectives of the invention. Preferably the biasing device takes the form of a circular plug 51, made of bronze or other low friction metal, inserted into a circular recess 53 in the bottom of the movable jaw 25. A concave button 55 located beneath the plug 51 in the recess 53 exerts a constant outwardly directed biasing force on the plug 51 tending to raise the movable jaw 25 to the limit of movement allowed by the channel guide strips 49, thus creating the minimum friction between the movable jaw 25 and the base member 12 while at the same time maintaining the jaw 25 in a plane parallel to the top surface 12t of the base member 12 with no changes of vertical position during the tightening process.

The advantages of the novel vise construction of the present invention become apparent when analyzing the nature and effect of the stresses and strains present in the vise structure when the movable jaw 25 is securely tightened down against a work piece. To maintain the work piece in a given position it is imperative that neither the base member 12, the base member fixed jaw 18, or the movable jaw 25 move laterally or vertically or in any form of bending. Ordinarily the reaction forces set up in opposition to the compression of the work piece tend to force the jaws of the vise apart and since the jaws are some finite distance away from the body of the vise there is a bending effect tending to bend both ends of the vise body downwardly and allow the center portion of the vise body to rise into a bow configuration. In the apparatus of the present invention the same forces are at work producing the same strains, but the forces and strains are isolated in the clamping means, that is the rod 30 and the two fixed clamping jaws 32 and 34. The large clearances between the base member and the clamping means allow the rod 30 to bend up in the middle without contacting the base member. The other clearances allow the fixed clamping jaws 32 and 34 to bend and distort without transferring any of the high bending moments or tensile forces to the base member. Because the stem bearing jaw 34 will tend to bend outwardly and away from the base member 12 at the point of normal contact X and would thus allow chips and grindings to fall into the space and interfere with the established clearances there is provided a guard plate 57 to cover over the space between the "X" portion of the jaw 34 and the base member 12. While referring to the fixed bearing jaw 34, mention should be made of the clearance required between the stem 45 and the bore 41. Since one of the ultimate objectives of the structure is to eliminate all but axial loads on the stem 45, sufficient clearance must be provided between the bearing jaw 34 and stem 45 to permit distortion and displacement of the jaw 34 without the transfer of the forces producing these strains to the stem. When the movable jaw 25 is tightened against a work piece the stem collar 43 obviously will be seated snugly into the concave end portion of the bore 41 in the jaw 34, but the collar 43 with its rounded or convex end merely pivots within the bore 41 as strain is induced in the fixed jaw 34, thus preventing the appearance of undesired forces in the adjusting stem 45.

Having examined the operation of the vise, it is easily seen that the base member, which attaches the vise to the machine tool and basically supports the work piece, remains completely free of the stress and strain associated with tightening of the vise and therefore remains constant in its set position with respect to the machine tool to insure the maintenance of the position of the work piece throughout the operation. It will also be apparent to those skilled in the art that modifications which would alter the jaw adjusting means from a threaded screw to a lever or cam arrangement could be made without departing from the spirit or scope of the invention. The clamping or stress isolation means may also take various forms and could be disposed on the outside rather than the inside of the base member. Other modifications may well occur to those skilled in the art within the broad teaching of this specification and hence it is my intention that the scope of protection afforded hereby shall be limited only insofar as said limitations are set forth in the appended claims.

I claim:
1. A vise comprising;
   a base having a smooth top sliding surface and a fixed vise jaw member upstanding from said surface on one end thereof;
   a second vise jaw member slidably positioned on the smooth top surface of said body in opposing relation to the fixed jaw member;
   a clamp having;
      a rigid spacer member, and
      first and second fixed clamping jaws secured to the ends of the spacer member, said clamp being carried by the base and disposed with respect thereto so that at least a portion of the first fixed clamping jaw abutts at least a portion of the said fixed vise jaw;
   screw means rotatably carried by the second one of said fixed clamping jaws, said screw means being threaded into second vise jaw member.

2. A vise comprising;
   a base member including means forming a fixed jaw;
   a clamp having first and second spaced apart jaws, said first jaw being in contact with the said fixed jaw forming means;
   a movable jaw positioned in opposing relation to the fixed jaw forming means;
   means operably interconnecting the movable jaw and the said second jaw of the clamp.

3. The vise of claim 2 wherein at least a portion of the clamp is carried interiorly of the base member.

4. A vise comprising;
   a base member adapted for attachment to a work supporting platform and having;
      an upstanding fixed jaw having a flat face,
      a smooth sliding surface lengthwise of said base member and normal to the flat face of the said fixed jaw, and
      a bore beneath the sliding surface and through the base member lengthwise thereof, a movable jaw mounted on the said smooth sliding surface of the base member;

a rigid rod disposed in said bore, said rod being dimensioned in its length to protrude from the bore at each of its ends;

a first jaw attached to and abutting one end of the rod and having a portion of the jaw abutting the said fixed jaw of the base member;

a second jaw attached to and abutting the other end of the rod and extending above the level of the smooth surface of the base member; and means carried by said second jaw and operably linked to the said movable jaw for causing movement of the movable jaw lengthwise of the base member along the said smooth surface.

5. The vise of claim 4, and further including;

spring means disposed between the movable jaw and the base member and arranged to provide a biasing force tending to separate the movable jaw and base member in a direction perpendicular to the said smooth sliding surface.

6. Work holding apparatus comprising;

a body member for supporting said apparatus on a platform;

a clamp carried by the body member and having a pair of opposed relatively movable jaws and having means responsive to a force to move one jaw with respect to the other; and said body member having a single fixed jaw means disposed between the said two jaws of the clamp and in abutting contact with one of the said clamping jaws.

References Cited by the Examiner

UNITED STATES PATENTS

| | | | |
|---|---|---|---|
| 575,686 | 1/1897 | Brockett | 269—242 |
| 713,189 | 11/1902 | Yates | 269—250 |

WILLIAM W. DYER, JR., *Primary Examiner.*

ROBERT C. RIORDON, *Examiner.*